United States Patent
Ki et al.

(10) Patent No.: US 9,139,889 B2
(45) Date of Patent: Sep. 22, 2015

(54) APPARATUS FOR ATOMIZING MOLTEN SLAG AND RECOVERING VALUABLE METAL

(75) Inventors: Joon-Seong Ki, Incheon (KR); Joon-Ho Lee, Gyeonggi-Do (KR); Jin-Ill Hwang, Incheon (KR)

(73) Assignees: Hyundai Steel Company, Incheon (KR); Korea University Research and Business Foundation, Seoul (KR)

( * ) Notice: Subject to any disclaimer, the term of this patent is extended or adjusted under 35 U.S.C. 154(b) by 70 days.

(21) Appl. No.: 13/882,682

(22) PCT Filed: Aug. 30, 2011

(86) PCT No.: PCT/KR2011/006426
§ 371 (c)(1),
(2), (4) Date: Apr. 30, 2013

(87) PCT Pub. No.: WO2012/060547
PCT Pub. Date: May 10, 2012

(65) Prior Publication Data
US 2013/0228958 A1    Sep. 5, 2013

(30) Foreign Application Priority Data
Nov. 4, 2010  (KR) .................. 10-2010-0109416

(51) Int. Cl.
C22B 5/02    (2006.01)
C22B 7/04    (2006.01)
C21B 3/08    (2006.01)

(52) U.S. Cl.
CPC ... *C22B 5/02* (2013.01); *C21B 3/08* (2013.01); *C22B 7/04* (2013.01); *Y02W 30/54* (2015.05)

(58) Field of Classification Search
CPC ................ C22B 5/02; C22B 7/04; C21B 3/08
USPC ................................................. 266/227, 232
See application file for complete search history.

(56) References Cited

U.S. PATENT DOCUMENTS 3,857,699 A  * 12/1974  Ammann et al. ............... 423/54
6,196,479 B1    3/2001  Edlinger
8,534,578 B2 *  9/2013  Ki et al. .......................... 241/18

FOREIGN PATENT DOCUMENTS

| JP | 09-013106 | 1/1997 |
| JP | 2000-234715 A | 8/2000 |
| JP | 2006-328519 A | 12/2006 |
| KR | 10-1999-0051972 A | 7/1999 |
| KR | 10-0356158 B1 | 9/2002 |

OTHER PUBLICATIONS

English Language translation of the application, 10-1997-0071413 Jul. 1999 which becomes KR 100356158.*
Office Action dated Jan. 27, 2014, in Chinese Patent Application No. 201180063887.3.

* cited by examiner

*Primary Examiner* — Scott Kastler
(74) *Attorney, Agent, or Firm* — Mintz Levin Cohn Ferris Glovsky and Popeo, P.C.; Kongsik Kim; Carolina Säve

(57) ABSTRACT

The present invention relates to an apparatus for atomizing molten slag and recovering valuable metals, and more particularly to an apparatus for atomizing molten slag and recovering valuable metals, which enables molten slag of a blast furnace or a converter or an electric furnace to be atomized and valuable metals to be recovered.

10 Claims, 4 Drawing Sheets

APPARATUS FOR ATOMIZING MOLTEN SLAG AND RECOVERING VALUABLE METAL

CROSS-REFERENCES TO RELATED APPLICATIONS

This application is a U.S. national phase application, pursuant to 35 U.S.C. §371, of PCT/KR2011/006426, filed Aug. 30, 2011, designating the United States, which claims priority to Korean Application No. 10-2010-0109416, filed Nov. 4, 2010. The entire contents of the aforementioned patent applications are incorporated herein by this reference.

TECHNICAL FIELD

The present invention relates to an apparatus for atomizing molten slag and recovering valuable metals, and more particularly to an apparatus for atomizing molten slag and recovering valuable metals, which enables molten slag of a blast furnace or a converter or an electric furnace to be atomized and valuable metals to be recovered.

BACKGROUND ART

Slag is a product which is essentially generated in a steel smelting process. Slag is essentially produced from the gangue components of iron ore or coke in an iron making process, or from oxides obtained upon oxidation and deoxidation of molten iron or molten steel in a steel making process or from side materials, etc., added for refining.

Slag, which is composed mainly of $SiO_2$ and $CaO$, includes $Al_2O_3$, $FeO$, $MgO$, $P_2O_5$ and $CaS$, depending on the type of refining reaction.

Iron making slag is composed mainly of $CaO$—$SiO_2$—$Al_2O_3$, and steel making slag based on oxidation of molten iron or molten steel is composed mainly of $CaO$—$SiO_2$—$FeO$.

SUMMARY OF THE DISCLOSURE

An object of the present invention is to provide an apparatus for atomizing molten slag and recovering valuable metals, which enables atomization of molten slag of a blast furnace or a converter or an electric furnace, and facilitates recovery of valuable metals and recovery of sensible heat of the slag.

In order to accomplish the above object, the present invention provides an apparatus for atomizing molten slag and recovering valuable metals, comprising a slag pot having a space portion therein; a vortex forming member disposed at an upper portion of the slag pot and having an upper portion formed in a hopper shape so as to supply the molten slag into the slag pot while forming a vortex in the molten slag; a slag supply pot which receives molten slag of a blast furnace or a converter or an electric furnace from a slag injection cup, temporarily stores the molten slag, and supplies the molten slag at a predetermined flow rate into the vortex forming member; and a reducing agent supplying pipe member for adding a reducing agent to the molten slag which is supplied into the vortex forming member.

The vortex forming member may have the upper portion formed in the hopper shape an inner diameter of which is gradually decreased downwards, and may have a lower portion formed in a linear pipe shape.

The slag supply pot may include an inlet formed at a predetermined position of an upper portion thereof, and an outlet formed at a predetermined position of a lower portion thereof and extending to the upper portion of the vortex forming member.

The reducing agent supplying pipe member may be configured such that an end thereof is disposed toward a space between a center of the upper portion of the vortex forming member and an edge thereof so that the reducing agent is added to the space between a center and an edge of vortex formation of the molten slag.

In addition, the present invention provides an apparatus for atomizing molten slag and recovering valuable metals, comprising a slag pot having a space portion therein; a vortex forming member disposed at an upper portion of the slag pot and formed in a hopper shape so as to supply the molten slag into the slag pot while forming a vortex in the molten slag; a slag supply pot which receives molten slag of a blast furnace or a converter or an electric furnace from a slag injection cup, temporarily stores the molten slag, and supplies the molten slag at a predetermined flow rate into the vortex forming member; and a cooler for cooling the molten slag supplied into the slag pot via the vortex forming member.

The vortex forming member may have the hopper shape an inner diameter of which is gradually decreased from an upper inlet toward a lower outlet.

The cooler may include one or more selected from among a steam supply portion for supplying steam into the slag pot, and a gas supply portion for supplying a gas into the slag pot.

The slag pot may include a recovery pipe member for recovering the slag which is solidified while dropping directly under the vortex forming member.

The slag pot may include a solid slag outlet formed at a predetermined position of a lower portion thereof so as to communicate with the space portion and to discharge the cooled and solidified slag to outside, and the space portion may include a guide slope which is slanted and extends toward the solid slag outlet.

The slag pot may include a waste heat discharge pipe formed at a predetermined position of the upper portion thereof so as to discharge hot steam and hot air generated upon cooling the molten slag, and the waste heat discharge pipe may include a heat exchanger so that heat is recovered from the hot steam and the hot air to produce hot water.

The apparatus may further comprise a reducing agent supplying pipe member for adding a reducing agent to the molten slag which is supplied into the vortex forming member.

The reducing agent supplying pipe member may be configured such that an end thereof is disposed toward a space between a center of the upper portion of the vortex forming member and an edge thereof so that the reducing agent is added to the space between a center and an edge of vortex formation of the molten slag.

According to the present invention, valuable metals can be efficiently recovered from molten slag using a vortex, and the molten slag can be atomized in the course of solidification, thus obviating the need for additional crushing of the reduced slag, and sensible heat is recovered from the atomized slag, thus increasing the recovery efficiency of sensible heat.

Also, the recovered sensible heat can be used in heat exchange, thus decreasing energy consumption for obtaining hot water or steam.

As mentioned above, the rate of recovery of valuable metals from the molten slag which is essentially produced in steel mills can be increased, and crushing energy can be decreased via the atomization of the slag, and performance of separation between the valuable metals and the reduced slag can be improved, and in the course of solidification, waste heat of the molten slag and sensible heat of the reduced slag can be recovered, thus effectively saving energy.

DESCRIPTION OF THE REFERENCE NUMERALS IN THE DRAWINGS

| 10, 110: slag pot | 11, 111: space portion |
|---|---|
| 13: outlet | 15, 113: slag pot cover |
| 20, 120: vortex forming member | |
| 30, 130: slag supply pot | |
| 31, 131: inlet | 33, 133: outlet |
| 35, 135: on-off control valve | |
| 40, 210: reducing agent supplying pipe member | |
| 41, 211: reducing agent storage portion | |
| 43, 213: control valve | |
| 50, 150: slag injection cup | 60, 160: controller |
| 115: solid slag outlet | |
| 117: waste heat discharge pipe | |
| 140: cooler | 170: recovery pipe member |
| 171: guide portion | 173: outlet |
| 180: guide slope | 190: heat exchanger |
| 220: sensible heat recovery device | |
| 221: steam supply portion | |
| 223: sensible heat discharge pipe | |
| 225: sensible heat recovery heat exchanger | |

DETAILED DESCRIPTION

Hereinafter, a detailed description will be given of an apparatus for atomizing molten slag and recovering valuable metals according to the present invention.

The apparatus for atomizing molten slag and recovering valuable metals according to the present invention is configured such that molten slag is supplied into a slag pot while forming a vortex, thus increasing the mixing efficiency with a reducing agent, thereby increasing the recovery efficiency of valuable metals and atomizing the molten slag.

First Embodiment

A first embodiment is based on a principle in which molten slag is supplied into a slag pot while forming a vortex, thus increasing the mixing efficiency with a reducing agent, thereby easily recovering valuable metals from the molten slag.

An apparatus for atomizing molten slag and recovering valuable metals according to the first embodiment comprises a slag pot 10, a vortex forming member 20, a slag supply pot 30, and a reducing agent supplying pipe member 40.

Figure 1:
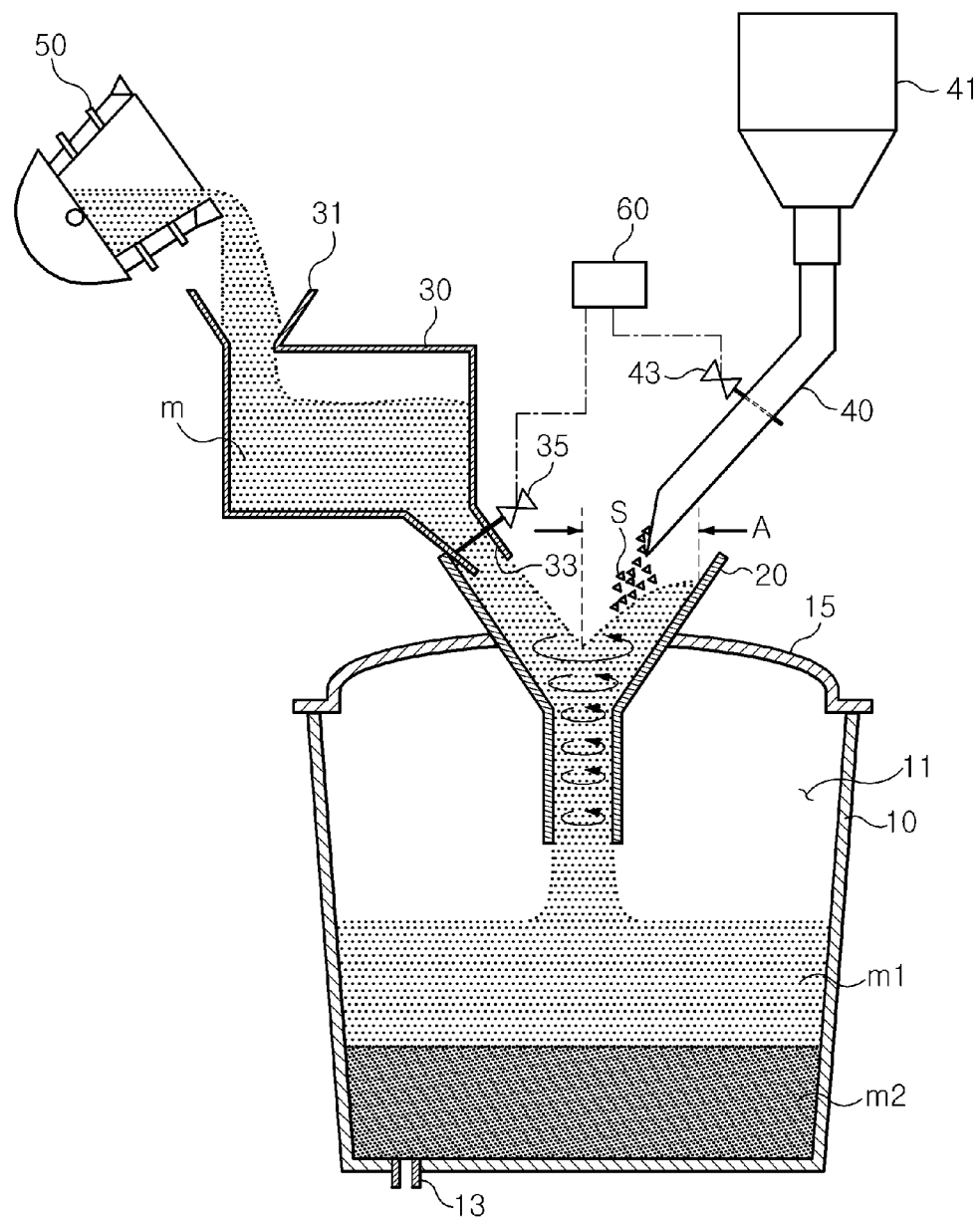
FIG. 1 illustrates an apparatus for atomizing molten slag and recovering valuable metals according to a first embodiment of the present invention.

As illustrated in FIG. 1, the slag pot 10 is configured such that a space portion 11 is formed therein, and an outlet 13 is formed at a lower portion thereof, and the upper portion thereof is selectively opened or closed by means of a slag pot cover 15.

The outlet 13 is provided to discharge valuable metals, which will be described later, and the slag pot cover 15 may be provided to prevent the temperature of molten slag (m) from decreasing. However, the outlet 13 and the slag pot cover 15 may be omitted, depending on circumstances and requirements.

The vortex forming member 20 is provided at the upper position of the slag pot 10, and has an upper portion formed in a hopper shape so as to supply the molten slag (m) into the slag pot 10 while forming a vortex in the molten slag. The upper portion of the vortex forming member 20 is provided in the form of a hopper, the inner diameter of which is gradually decreased downwards, and the lower portion of the vortex forming member 20 has a linear pipe shape.

In this embodiment, the vortex forming member 20 is configured such that the upper portion is provided to pass through the slag pot cover 15, and the hopper shape of the upper portion is disposed outside the space portion 11 and the linear pipe shape is disposed in the space portion 11.

The vortex forming member 20 induces a flow including a vortex (a whirl) upon supplying the molten slag (m) into the slag pot 10, thus increasing the mixing efficiency of the molten slag (m) with the reducing agent (s).

The slag supply pot 30 receives the molten slag (m) from a slag injection cup 50, temporarily stores the slag, and supplies the slag into the vortex forming member 20. To form a vortex, the molten slag (m) should be supplied at a predetermined flow rate into the vortex forming member 20, and thus the slag supply pot 30 is provided so that the molten slag (m) is supplied at a predetermined flow rate into the vortex forming member 20.

The slag supply pot 30 includes an inlet 31 formed at a predetermined position of the upper portion thereof, and an outlet 33 formed at a predetermined position of the lower portion thereof and extending to the upper portion of the vortex forming member 20. The inlet 31 is preferably formed to be larger than the outlet 33 so that the molten slag (m) may be supplied at a predetermined flow rate into the vortex forming member 20, and the outlet 33 may be provided with an on-off control valve 35 so that the flow rate of the molten slag (m) discharged via the outlet 33 may be controlled.

The on-off control valve 35 controls the on-off operation by virtue of an additional controller 60, and controls the flow rate of the molten slag (m) discharged into the vortex forming member 20 from the slag supply pot 30.

The slag supply pot 30 may not be limited in its shape and capacity so long as it supplies the molten slag (m) at a predetermined flow rate into the vortex forming member 20.

The molten slag (m) may correspond to molten slag (m) of a blast furnace or a converter or an electric furnace, and also includes any kind of molten slag generated in steel mills, steel plants, non-ferrous smelting and waste treatment plants, etc., and any slag generated after secondary processing of waste created therefrom.

The slag generated in steel mills and steel plants contains large amounts of valuable metals, such as iron, chromium, manganese, etc. When such slag is discharged without undergoing any treatment, economic loss and environmental pollution may be caused. Hence, the valuable metals are recovered, and the slag from which the valuable metals are recovered may be recycled via sensible heat recovery, thus lowering energy consumption.

The first embodiment aims to easily recover valuable metals, and, for example, molten slag of an electric furnace, containing large amounts of valuable metals, may be adapted therefor.

The slag injection cup 50 is a kind of pot which receives the molten slag (m) and supplies it into the slag supply pot 30.

The reducing agent supplying pipe member 40 is provided so that a reducing agent (s) is added to the molten slag (m) which is supplied into the vortex forming member 20. The reducing agent supplying pipe member 40 is configured such that the end thereof is disposed toward a space (A) between the center of the upper portion of the vortex forming member 20 and the edge thereof so that the reducing agent (s) is added to the space (A) between the center and the edge of vortex formation of the molten slag (m).

The center of the vortex formation has a fast flow rate, and thus when the reducing agent (s) is added, it is not mixed with the molten slag (m) but is directly discharged downwards through the center of the vortex formation. The edge of the vortex formation, which has a slow flow rate, needs an excessively long period of time to mix the reducing agent with the molten slag, and is thus undesirable in terms of the recovery efficiency of valuable metals.

Hence, in order to increase the mixing efficiency of the reducing agent (s) and the molten slag (m), the reducing agent (s) is added to the space (A) between the center and the edge of the vortex formation of the molten slag (m).

The reducing agent supplying pipe member 40 is connected to a reducing agent storage portion 41 thereabove so that a predetermined amount of reducing agent (s) is supplied. The reducing agent supplying pipe member 40 is provided with a control valve 43 able to control the amount of supplied reducing agent, and the control valve is controlled by virtue of an additional controller. Furthermore, a configuration in which the reducing agent is supplied via the reducing agent supplying pipe member from the reducing agent storage portion is not included in the gist of the present invention, and thus a detailed description thereof is omitted.

The reducing agent (s) indicates any material able to reduce valuable metals in the molten slag (m), and may include aluminum dross, carbon, black carbon, waste carbon, pulverized coal, cokes, coal, etc. Also, the reduction of valuable metals may mean that, for example, $FeO$, $CrO_x$, etc. in molten slag are reduced into Fe, Cr, etc. The reducing agent is preferably provided in the form of powder to increase the reaction efficiency.

Although not shown, an assistant heater (not shown) may be provided to supply heat to the slag pot 10 so that the slag of the slag pot 10 is maintained in a molten state. The assistant heater prevents the temperature of the molten slag and the valuable metals from decreasing due to the excessive endothermic reaction after completion of the reduction with the addition of the reducing agent.

The action of the first embodiment is described below.

For the sake of the description, molten slag of an electric furnace containing large amounts of valuable metals is illustratively described. However, it is noted that the first embodiment is not necessarily limited to the molten slag of an electric furnace.

Specifically, molten slag (m) of an electric furnace is discharged into the slag injection cup 50. When the electric furnace is slanted, or in the case where the electric furnace has a door, when the door of the furnace is opened, the molten slag (m) is discharged into the slag injection cup 50.

The molten slag (m) discharged into the slag injection cup 50 is supplied into the slag supply pot 30 via the inlet 31 at the upper portion of the slag supply pot 30. The molten slag (m) supplied into the slag supply pot 30 is placed in the vortex forming member 20 via the outlet 33 at the lower portion of the slag supply pot, and is then supplied into the slag pot 10 while forming a vortex.

As such, the reducing agent (s) is added to the molten slag (m) via the reducing agent supplying pipe member 40, wherein the reducing agent supplying pipe member is configured such that its end is disposed toward the space (A) between the center of the upper portion of the vortex forming member 20 and the edge thereof so that the reducing agent (s) is added to the space (A) between the center and the edge of the vortex formation of the molten slag (m).

When the reducing agent (s) is added in the presence of a vortex formed at the upper portion of the vortex forming member 20, the reducing agent (s) is uniformly mixed with the molten slag (m), and the uniformly mixed molten slag (m) is supplied into the slag pot via the linear pipe of the vortex forming member 20 while forming the vortex.

The molten slag (m), which is supplied into the slag pot 10, is separated into valuable metals (m2) and the remaining molten slag (m1), and the valuable metals (m2) having high specific gravity is positioned at the lower portion of the slag pot 10, and the remaining molten slag (m1) is positioned thereon.

The remaining molten slag (m1) at the upper position is discharged and the valuable metals (m2) positioned at the lower portion of the slag pot 10 is then recovered. In the case where the slag pot 10 includes the outlet 13 at the lower portion thereof, the outlet 13 of the slag pot is opened, whereby valuable metals are recovered, and then the remaining molten slag (m1) may be recovered.

When the temperature of the molten slag (m) is decreased due to the excessive endothermic reaction with the addition of the reducing agent (s), additional heat is applied to the slag pot 10 using the assistant heater, so that the molten slag (m) may be maintained in a molten state. The assistant heater may not be limited in its shape so long as it increases the internal temperature of the slag pot 10.

The apparatus according to the first embodiment enables the molten slag to be uniformly mixed with the reducing agent, thus facilitating the recovery of the valuable metals from the slag.

Second Embodiment

A second embodiment is based on a principle in which molten slag is atomized while forming a vortex when being supplied into a slag pot.

An apparatus for atomizing molten slag and recovering valuable metals according to the second embodiment comprises a slag pot 110, a vortex forming member 120, a slag supply pot 130, and a cooler 140.

Figure 2:
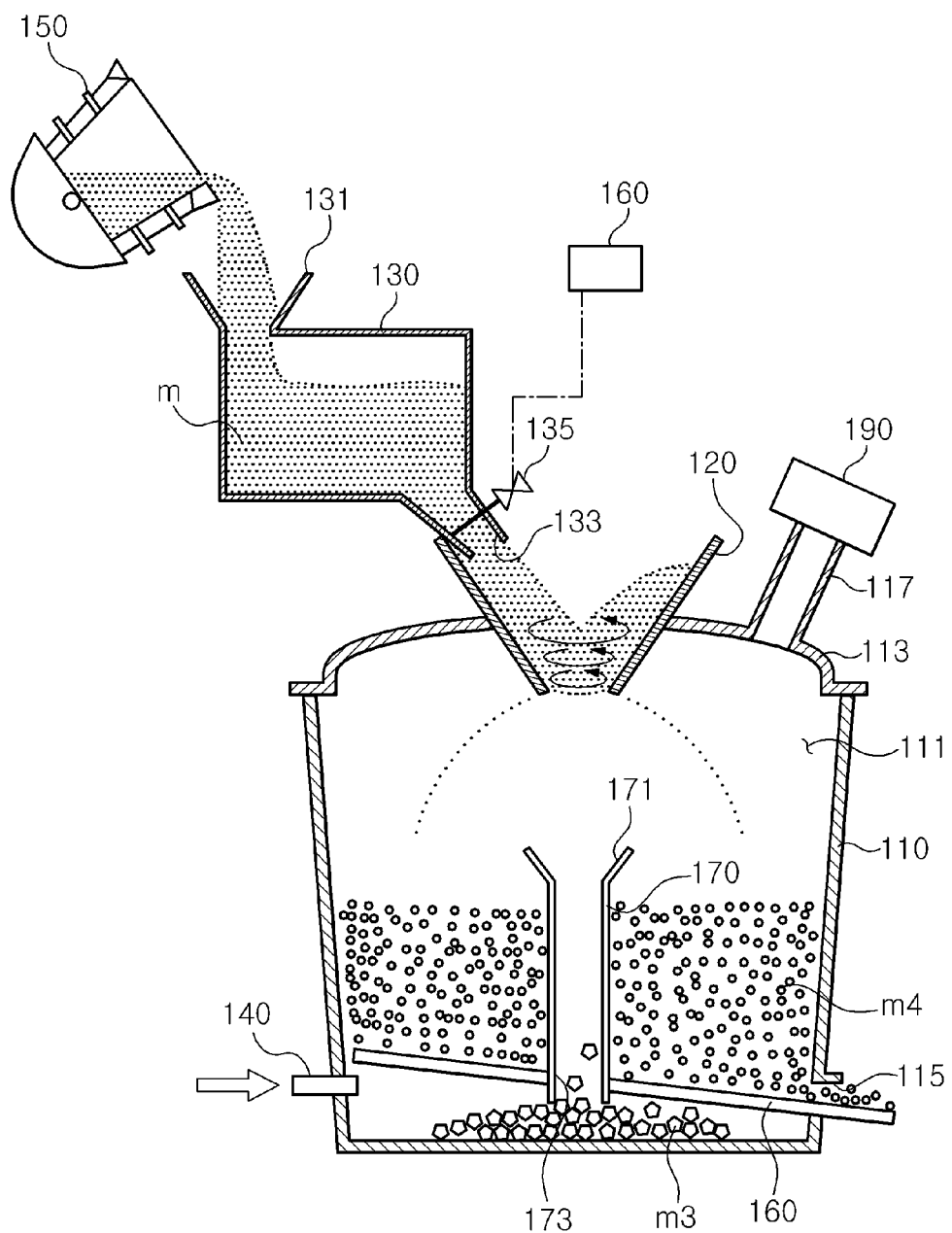
FIG. 2 illustrates an apparatus for atomizing molten slag and recovering valuable metals according to a second embodiment of the present invention.

As illustrated in FIG. 2, the slag pot 110 is configured such that a space portion 111 is formed therein, and the upper portion thereof is selectively opened or closed by means of a slag pot cover 113. The slag pot cover 113 may be omitted depending on circumstances and requirements.

The vortex forming member 120 is disposed at the upper portion of the slag pot 110 and is formed in a hopper shape so as to supply the molten slag (m) into the slag pot 110 while forming a vortex in the molten slag. The vortex forming member 120 has a hopper shape, the inner diameter of which is gradually decreased from the upper inlet toward the lower outlet.

In this embodiment, the vortex forming member 120 is configured such that the upper portion is provided to the slag pot cover 113, and the inlet is disposed outside the space portion 111 and the outlet is disposed in the space portion 111. The vortex forming member 120 forms a vortex (a whirl), so that droplets of the molten slag (m) may be individually scattered upon supplying the molten slag (m) into the slag pot 110, thereby atomizing the molten slag (m).

Specifically, the hopper shape of the vortex forming member 120 forms a vortex, and the vortex forming member has no linear pipe shape at the lower portion thereof, and thus upon supplying the slag into the slag pot 110, the molten slag (m) is provided in the form of droplet trajectories by high-speed flow and then instantly solidified, so that the molten slag (m) is atomized.

The vortex forming member 120 imparts motion momentum in a tangential direction to the outlet of the vortex forming member 120, thus continuously obtaining the atomized slag (m) particles.

The slag supply pot 130 receives the molten slag (m) from the slag injection cup 150, temporarily stores it, and then supplies it into the vortex forming member 120. Because the molten slag (m) should be supplied at a predetermined flow rate into the vortex forming member 120 to form a vortex, the slag supply pot 130 is provided so as to supply the molten slag (m) at a predetermined flow rate into the vortex forming member 120.

The slag supply pot 130 includes an inlet 131 formed at a predetermined position of the upper portion thereof, and an outlet 133 formed at a predetermined position of the lower portion thereof and extending to the upper portion of the vortex forming member 120. The inlet 131 is preferably formed to be larger than the outlet 133 so that the molten slag (m) may be supplied at a predetermined flow rate into the vortex forming member 120, and the outlet 133 may be provided with an on-off control valve 135 so that the flow rate of the molten slag (m) discharged via the outlet 133 may be controlled. The on-off control valve 135 controls the on-off operation by virtue of an additional controller 160.

The slag supply pot 130 may not be limited in its shape and capacity so long as it supplies the molten slag (m) at a predetermined flow rate into the vortex forming member 120.

The molten slag (m) may correspond to molten slag of a blast furnace or a converter or an electric furnace, and also includes any kind of molten slag generated in steel mills, steel plants, non-ferrous smelting and waste treatment plants, etc., and any slag generated after secondary processing of waste created therefrom.

The second embodiment aims to atomize the molten slag (m) in the course of solidification, and, for example, molten slag of a blast furnace containing few valuable metals may be adapted therefor. The sensible heat may be recovered from the atomized solid slag.

In the case of molten slag containing large amounts of valuable metals, it is preferred that recovery of the valuable metals be conducted first. This is because, even when the molten slag containing large amounts of valuable metals is solidified and atomized, the valuable metals may be oxidized in the course of recovering heat, making it difficult to use such slag to recover sensible heat.

The slag injection cup 150 is a kind of pot which receives the molten slag (m) and supplies it into the slag supply pot 130.

The cooler 140 functions to cool the molten slag in the form of droplets supplied into the slag pot 110. The cooler 140 may include one or more selected from among a steam supply portion for adding steam into the slag pot 110, and a gas supply portion for adding a gas into the slag pot.

The steam supply portion or the gas supply portion includes a steam or gas jet orifice which is formed at a predetermined position of the inner wall of the slag pot 110 to jet steam or gas into the space portion 111, and the steam or gas jet orifice may be provided with a porous plug or a steam or gas pipe.

In addition to the steam or gas, any type of fluid or gas may be used so long as it cools the molten slag (m).

On the other hand, the slag pot 110 includes a recovery pipe member 170 for recovering the slag which is solidified while dropping directly under the vortex forming member. The recovery pipe member 170 is provided in a tube shape wherein its upper portion is opened, and includes a guide portion 171 which receives the solidified slag via the open upper portion thereof.

Even when the molten slag (m) is supplied into the vortex forming member 120, a predetermined period of time is required to form a vortex, and the molten slag (m) before formation of the vortex is solidified into solid slag (m3) which is comparatively large upon being supplied into the slag pot. When the solid slag (m3) is combined with atomized slag (m4) which is atomized and solidified after formation of the vortex, air permeability may deteriorate and steam or gas jetting for atomizing the slag may be negatively affected.

The comparatively large solid slag (m3) recovered before formation of the vortex may be manufactured into aggregates having a predetermined size. Although not shown, a stopper may be provided to the vortex forming member to minimize the amount of the slag that is useful as aggregates.

Also, the recovery pipe member 170 includes an outlet 173 which is positioned under a guide slope 180 which will be described later, so that the solid slag (m3), which is solidified before formation of the vortex, may be recovered under the guide slope 180.

The slag pot 110 includes a solid slag outlet 115 formed at a predetermined position of the lower portion thereof so as to communicate with the space portion 111 such that the atomized slag (m4) which is cooled and solidified is discharged to the outside, and the space portion 111 includes the guide slope 180, which is slanted and extends toward the solid slag outlet 115. The guide slope 180 receives the solidified atomized slag (m4), and guides it toward the solid slag outlet 115.

The slag pot cover 113 includes a waste heat discharge pipe 117 at a predetermined position of the upper portion thereof. The waste heat discharge pipe 117 is a pipe through which hot steam and hot air generated upon cooling the molten slag (m) are discharged. The waste heat discharge pipe 117 may be provided with a heat exchanger 190. The heat exchanger 190 may recover heat from the hot steam and the hot air to produce hot water, or may be utilized for other end uses.

The action of the second embodiment is described below.

For the sake of the description, molten slag of a blast furnace containing few valuable metals is illustratively described. However, it is noted that the second embodiment is not necessarily limited to the molten slag of a blast furnace.

The second embodiment may be applied to the molten slag recovered via the first embodiment, and may also be applied to molten slag of iron making, steel making, smelting, etc., containing few valuable metals.

Specifically, molten slag (m) of a blast furnace is discharged into the slag injection cup 150. The molten slag (m) discharged into the slag injection cup 150 is supplied into the slag supply pot 130 via the inlet 131 at the upper portion of the slag supply pot 130. The molten slag (m) supplied into the slag supply pot 130 is placed in the vortex forming member via the outlet 133 at the lower portion of the slag supply pot, and is then supplied into the slag pot 110 while forming a vortex. In this procedure, steam or gas may be supplied into the slag pot 110 so that the molten slag (m) may be solidified in the course of being supplied into the slag pot 110.

As such, the molten slag (m) fed into the vortex forming member 120 is formed into comparatively large solid slag (m3) because initial vortex formation is insignificant. Subsequently, when the vortex is formed at a fast flow rate, motion momentum in a tangential direction is imparted to the outlet of the vortex forming member 120, and thus the slag is supplied into the slag pot 110 while forming small droplets which are radially scattered in conical form.

The molten slag (m) at the initial stage in which the vortex formation is insignificant drops directly under the vortex forming member and thus is recovered under the guide slope 180 via the recovery pipe member 170, after which the molten slag (m) whose vortex is formed is atomized and instantly solidified and thus drops onto the guide slope 180. The solidified atomized slag (m4) dropping on the guide slope 180 is naturally transferred via the gradient of the guide slope 180 and is thus discharged outside via the solid slag outlet 115.

Figure 4:
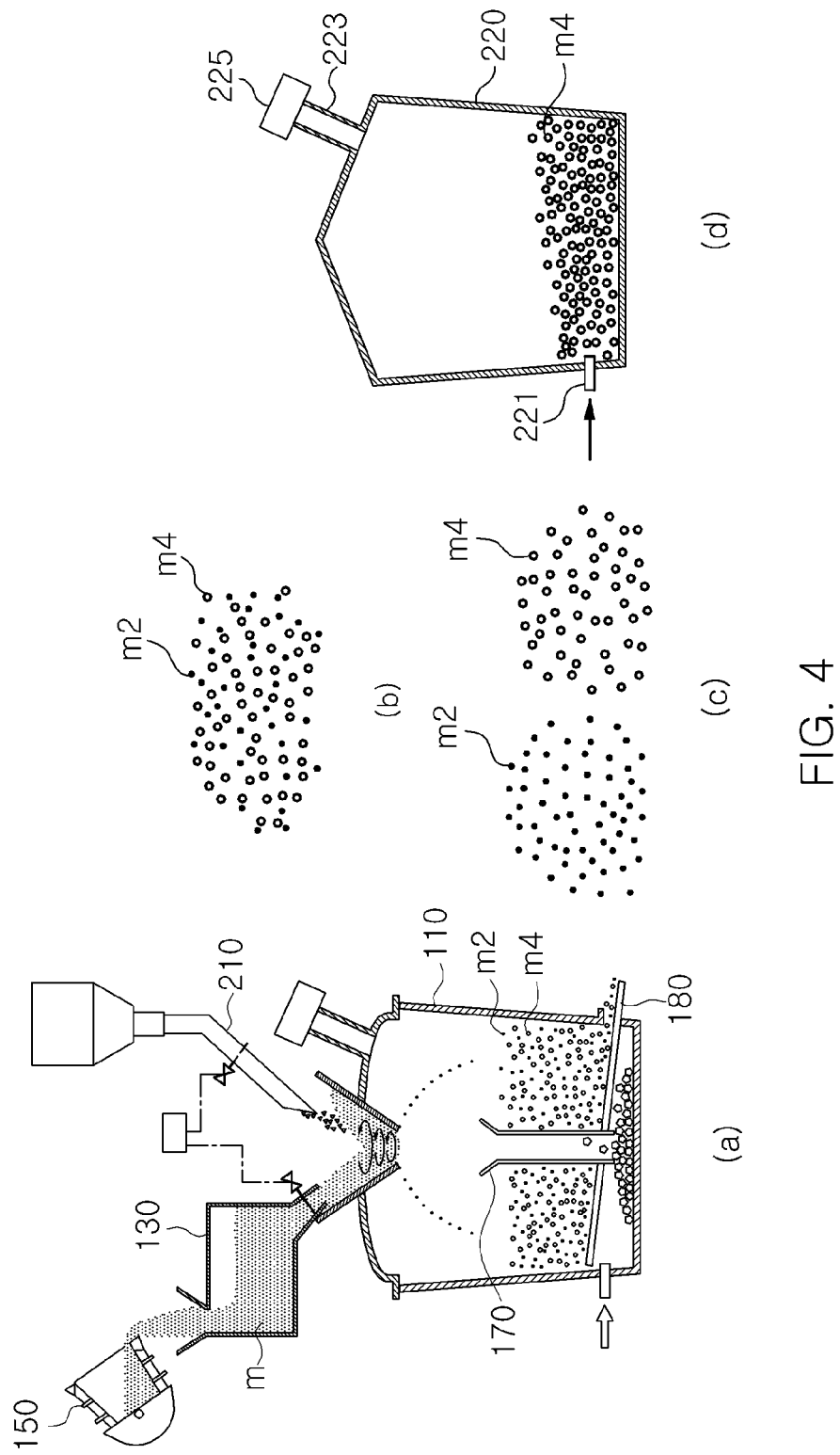
FIG. 4 illustrates a process of recovering valuable metals and recovering sensible heat of slag using the third embodiment of FIG. 3.

Heat of hot steam and hot air generated in this procedure is recovered by means of the heat exchanger 190 provided to the waste heat discharge pipe 117, and the atomized slag (m4) discharged to the outside via the solid slag outlet 115 may be fed into a sensible heat recovery device of FIG. 4 without an additional crushing process, so that sensible heat may be recovered.

For example, recovery of the sensible heat may be performed in such a manner that the solidified atomized slag is charged into the sensible heat recovery device having a steam supply portion and a sensible heat discharge pipe with a sensible heat recovery heat exchanger, and steam or hot air is introduced into the steam supply portion so that the solidified atomized slag (m4) is melted at low temperature and thereby heat of the slag may be recovered by the sensible heat exchanger.

Upon recovering the sensible heat, atomization of the slag enables higher heat to be recovered by means of the heat exchanger under conditions of low heat supply, thus increasing the recovery efficiency of sensible heat.

Third Embodiment

A third embodiment is based on a principle in which molten slag is supplied into a slag pot while forming a vortex, thus increasing the mixing efficiency with a reducing agent, and the slag is atomized by virtue of formation of the vortex upon supply of the mixed molten slag into the slag pot.

The atomized solid slag is subjected to a reduction reaction in the presence of the reducing agent and then is atomized, and thus contains a mixture of valuable metals and atomized solid slag having no valuable metal. Thus, only valuable metals may be recovered using magnetism or magnetic field without an additional crushing process.

The third embodiment may be applied to molten slag containing large amounts of valuable metals, and is different in terms of further comprising the reducing agent supplying pipe member of the first embodiment, compared to the second embodiment.

Figure 3:
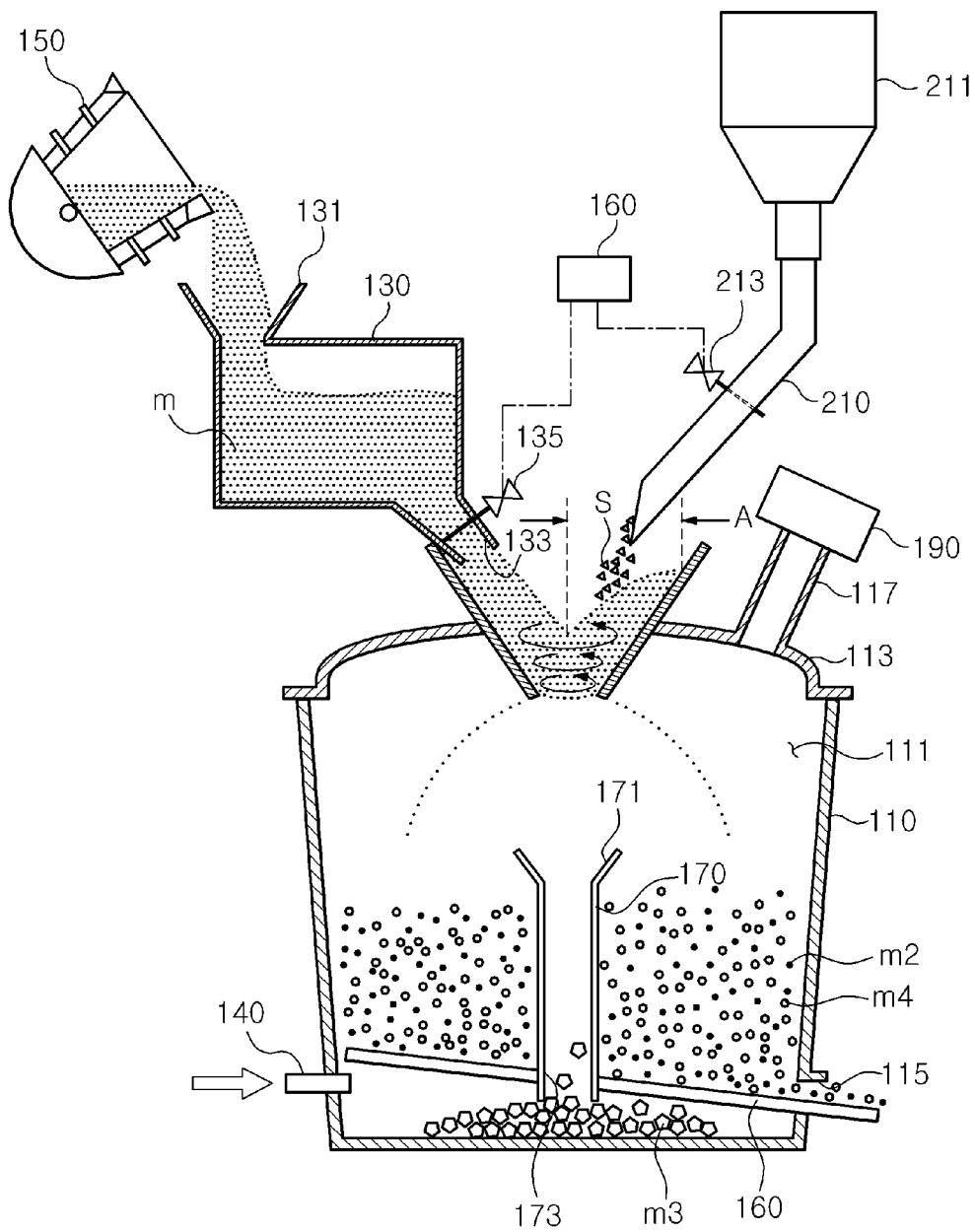
FIG. 3 illustrates an apparatus for atomizing molten slag and recovering valuable metals according to a third embodiment of the present invention.

As illustrated in FIG. 3, an apparatus for atomizing molten slag and recovering valuable metals according to the third embodiment comprises a slag pot 110, a vortex forming member 120, a slag supply pot 130, a cooler 140, and a reducing agent supplying pipe member 210. The configuration of the third embodiment is one in which the reducing agent supplying pipe member 210 of the first embodiment is added to the second embodiment, and thus a detailed description thereof is omitted.

In the third embodiment, the reason why the reducing agent supplying pipe member 210 is added is that, in the case of molten slag containing large amounts of valuable metals, it is preferred that recovery of the valuable metals be primarily performed. This is because, even when the molten slag containing large amounts of valuable metals is solidified and atomized, valuable metals may be oxidized in the course of recovering heat, making it difficult to use such slag to recover sensible heat.

With reference to FIG. 4, the action of the third embodiment is described below.

For the sake of the description, molten slag of an electric furnace containing large amounts of valuable metals is illustratively described. However, it is noted that the third embodiment is not necessarily limited to the molten slag of an electric furnace.

For example, the third embodiment may be applied in a case where the first embodiment is difficult to apply. As the reducing agent, aluminum dross has a higher melting point than Fe and thus is not dissolved when the first embodiment is applied, making it difficult to separate the valuable metals and the molten slag from each other.

With reference to FIGS. 3 and 4, molten slag (m) of an electric furnace is discharged into a slag injection cup 150. The molten slag (m) discharged into the slag injection cup 150 is supplied into the slag supply pot 130 via the inlet 131 at the upper portion of the slag supply pot 130. The molten slag (m) supplied into the slag supply pot 130 is placed in the vortex forming member 120 via the outlet 133 at the lower portion of the slag supply pot and then is supplied into the slag pot 110 while forming a vortex.

As such, the reducing agent (s) in powder form is added to the molten slag (m) by virtue of the reducing agent supplying pipe member 210, wherein the end of the reducing agent supplying pipe member is disposed toward the space (A) between the center of the upper portion of the vortex forming member 120 and the edge thereof so that the reducing agent (s) is added to the space (A) between the center and the edge of the vortex formation of the molten slag.

When the reducing agent (s) is added in the presence of the vortex formed by the vortex forming member 120, the reducing agent (s) and the molten slag (m) are uniformly mixed, and the uniformly mixed molten slag (m) may be supplied into the slag pot 110 while forming the vortex.

Also, in this procedure, steam or gas is supplied into the slag pot 110, so that the molten slag (m) may be solidified in the course of being supplied into the slag pot 110.

The molten slag (m) fed into the vortex forming member 120 is uniformly mixed with the reducing agent (s) so that a reduction reaction occurs. Simultaneously, initial vortex formation is insignificant, and thus the slag is formed into comparatively large solid slag (m3) while dropping, and subsequently, when the vortex is formed at a fast flow rate, motion momentum in a tangential direction is imparted to the outlet of the vortex forming member 120, and thus the molten slag (m) is supplied into the slag pot 110 while forming small droplets which are radially scattered in conical form.

The molten slag (m) at the initial stage in which the vortex formation is insignificant drops directly under the vortex forming member and thus is recovered under the guide slope 180 via the recovery pipe member 170, after which the molten slag (m) whose vortex is formed is atomized and instantly solidified and thus drops onto the guide slope 180.

As shown in (a) of FIG. 4, the atomized solid slag (m4) dropping on the guide slope 180 is discharged outside via the solid slag outlet 115 by means of the gradient of the guide slope 180.

Heat of hot steam and hot air generated in this procedure is recovered by means of the heat exchanger 190 provided to the waste heat discharge pipe 117, and the atomized solid slag (m4) discharged to the outside via the solid slag outlet 115 may be fed into the sensible heat recovery device of FIG. 4 without an additional crushing process and thus the sensible heat may be recovered.

On the other hand, the solid slag (m3) recovered under the guide slope 180 may be manufactured into aggregates. As shown in (b) and (c) of FIG. 4, the solid slag (m2, m4) discharged outside by the gradient of the guide slope is the atomized solid slag containing valuable metals (m2), and thus the valuable metals are recovered therefrom using magnetism.

As shown in (d) of FIG. 4, the remaining atomized solid slag (m4) after recovery of the valuable metals is fed into the sensible heat recovery device 220 to recover sensible heat.

Recovering the sensible heat is carried out in such a manner that the atomized solid slag (m4) containing no valuable metal is charged into the sensible heat recovery device 220 having a steam supply portion 221 and a sensible heat discharge pipe 223 with a sensible heat recovery heat exchanger 225, and steam or hot air is introduced into the steam supply portion 221 so that the solid slag is melted at low temperature and thereby heat of the slag may be recovered by means of the sensible heat exchanger.

Upon recovering the sensible heat, atomization of the slag enables higher heat to be recovered by means of the heat exchanger under conditions of low heat supply, thus increasing the recovery efficiency of sensible heat.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An apparatus for atomizing molten slag and recovering metals, comprising:
    a slag pot;
    a first supplier connected to the slag pot and having an upper portion formed in a hopper shape for supplying molten slag to the slag pot while forming a vortex in the molten slag;
    a second supplier connected to the first supplier for supplying molten slag to the first supplier; and
    a third supplier connected to the slag pot for supplying a reducing agent to the slag pot,
    wherein an end of the third supplier is disposed above a space defined between a center of the first supplier and an edge thereof so that the reducing agent can be supplied to the molten slag in the first supplier at the position of the space.

2. The apparatus of claim 1, wherein the first supplier has a lower portion formed in a linear pipe shape and inner diameter of the hopper shape is gradually decreased downwards.

3. The apparatus of claim 1, wherein the second supplier has an outlet extending to the upper portion of the first supplier.

4. An apparatus for atomizing molten slag and recovering metals, comprising:
    a slag pot;
    a first supplier connected to the slag pot and formed in a hopper shape for supplying molten slag to the slag pot while forming a vortex in the molten slag;
    a second supplier connected to the first supplier for supplying molten slag to the first supplier; and
    a cooler for cooling the molten slag supplied to the slag pot
    wherein the slag pot includes a waste heat discharge pipe formed at an upper portion thereof so as to discharge hot steam and hot air generated upon cooling the molten slag, and
    wherein the waste heat discharge pipe is connected to a heat exchanger to produce hot water by using heat recovered from the hot steam and the hot air.

5. The apparatus of claim 4, wherein inner diameter of the hopper shape is gradually decreased downwards.

6. The apparatus of claim 4, wherein the cooler includes a steam supplier for supplying steam to the slag pot, a gas supplier for supplying a gas to the slag pot, or both.

7. The apparatus of claim 4, wherein the slag pot includes a recovery pipe for recovering the slag which has been or is being solidified while dropping vertically downward from the first supplier.

8. The apparatus of claim 4, wherein the slag pot includes:
    a solid slag outlet formed at a lower portion thereof; and
    a guild slope slanted and extended toward the solid slag such that cooled and solidified slag can be discharged out of the slag pot through the slag outlet.

9. The apparatus of claim 4, further comprising a third supplier for supplying a reducing agent to the molten slag supplied to the first supplier.

10. The apparatus of claim 9, wherein an end of the third supplier is disposed above a space defined between a center of the first supplier and an edge thereof so that the reducing agent can be supplied to the molten slag in the first supplier at the position of the space.

* * * * *